United States Patent [19]

Kasner et al.

[11] 4,238,741
[45] Dec. 9, 1980

[54] TECHNIQUE FOR GENERATING 14 AND 16 MICRON $CO_2$ LASER RADIATION

[75] Inventors: William H. Kasner, Penn Hills; Vincent A. Toth, North Huntingdon, both of Pa.; Lyn D. Pleasance, Livermore, Calif.

[73] Assignee: Westinghouse Electric Corp., Pittsburgh, Pa.

[21] Appl. No.: 863,193

[22] Filed: Dec. 22, 1977

[51] Int. Cl.² .............................................. H01S 3/097
[52] U.S. Cl. ........................................... 331/94.5 PE
[58] Field of Search ......... 331/94.56, 94.5 P, 94.5 PE

[56] References Cited

U.S. PATENT DOCUMENTS

| | | | |
|---|---|---|---|
| 4,053,851 | 10/1977 | Krupke | 331/94.5 G |
| 4,053,852 | 10/1977 | Krupke | 331/94.5 G |
| 4,136,317 | 1/1979 | Stregack et al. | 331/94.5 G |

OTHER PUBLICATIONS

W. H. Kasner et al., "Electrical Discharge Excited 16μm $CO_2$ Laser," 1977 IEEE/OSA Conference on Laser Engineering and Applications, Digest of Technical Papers, Washington, D.C., USA, 1–3 Jun. 1977, p. 12.

W. H. Kasner et al., "Laser Emission from the 13.9-μm $10°0 \rightarrow 01^10$ $CO_2$ Transition in Pulsed Electrical Discharges,"*Appl. Phys. Lett.*, vol. 31, No. 2, Jul. 15, 1977, pp. 82–84.

T. J. Manuccia et al., "14-and 16-μ Gasdynamic $CO_2$ Lasers", *Appl. Phys. Lett.*, vol. 29, No. 6, Sep. 15, 1976, pp. 360–362.

*Primary Examiner*—James W. Davie
*Attorney, Agent, or Firm*—M. P. Lynch

[57] ABSTRACT

The direct electrical discharge excitation, pulsed or CW, of a laser gas medium consisting of $CO_2:N_2:He$ present in the approximate ratio of 1:2:25 at a total gas pressure of between approximately 8 and 12 Torr and an operating temperature between approximately 125° K. and 150° K. supports 16 micron laser radiation on the $02°0 \rightarrow 01^10$ $CO_2$ vibrational transition, and 14 micron laser radiation on the $10°0 \rightarrow 01^10$ $CO_2$ vibrational transition.

8 Claims, 6 Drawing Figures

TECHNIQUE FOR GENERATING 14 AND 16 MICRON $CO_2$ LASER RADIATION

BACKGROUND OF THE INVENTION

Since their discovery, lasers have been used increasingly for commercial and military applications. High efficiency, high power output and simplicity of operation are desirable system characteristics for such lasers. Recently, attention has been focused upon the potential use of lasers for separation of isotopes, particularly isotopes of uranium. The important quality of the laser for achieving isotope separation is the spectral coincidence of the laser emission with an absorption line of a single isotope. A strong absorption band of uranium hexafluoride ($UF_6$) is centered at a wavelength of approximately 16 micrometers ($\mu m$).

Previous work with $CO_2$ lasers on transitions which produce wavelengths of approximately 9.4 $\mu m$ and 10.6 $\mu m$ has been extensive. However, despite extensive research, the possibility of using stimulated emission at these wavelengths to cause stimulated 14 micron and 16 micron laser emissions from transitions to the $01^10$ $CO_2$ vibrational level has only recently been suggested. Method and apparatus for achieving both 14 and 16 micron laser emission is described in detail in U.S. patent application Ser. No. 719,202, filed Aug. 30, 1976, entitled "GENERATION OF 14 MICRON AND 16 MICRON LASER RADIATION FROM A $CO_2$ GAS LASER", U.S. Pat. No. 4,168,478, assigned to the assignee of the present invention incorporated herein by reference.

A technique for generating 16 micron laser radiation utilizing optical pumping is discussed by R. M. Osgood, Jr., in an article entitled: "Optically Pumped 16 Micron $CO_2$ Laser," appearing in APPLIED PHYSICS LETTERS 28, 342, dated March, 1976.

Further disclosure of 14 micron and 16 micron $CO_2$ laser radiation is described in U.S. Pat. Nos. 4,053,851 and 4,053,852, issued Oct. 11, 1977.

SUMMARY OF THE INVENTION

The disclosed technique for developing 14 micron and 16 micron laser radiation results from the transition between the $10^00$ vibrational energy level and the $01^10$ vibrational energy level having a band centered at approximately 13.9 microns, and the transition between the $02^00$ vibrational energy level and the $01^10$ vibrational energy level of the $CO_2$ molecule having a band center at approximately 16.2 microns, respectively. The successful extraction of 16 micron laser radiation is achieved by controlling the laser parameters as follows:

1. Cooling a laser gas mixture consisting of $CO_2:N_2:He$ at a ratio corresponding to 1:2:25, allowing for a ±2 variation of any one of the laser gas constituents;
2. Maintaining a laser gas pressure in the range of between approximately 5 and 20 Torr, with optimum pressure conditions being represented by the range of approximately 8 to 12 Torr;
3. Cooling the laser gas mixture to maintain a laser gas operating temperature in a range of approximately 125° K. to 230° K., with the optimum operating temperature range being between approximately 125° K. and 150° K.;
4. Electrically exciting the laser gas mixture; and
5. Providing a time delay between the electrical excitation of the $00^01$ $CO_2$ vibrational energy level and the transfer of the excited $CO_2$ molecules from the $00^01$ level to the $02^00$ $CO_2$ vibrational energy level to permit a more complete depopulation, or relaxation, of the $01^10$ $CO_2$ vibrational energy level.

The above parameters apply to the extraction of 14 micron laser radiation with the only exception being the transfer of the excited $CO_2$ molecules from the $00^01$ level to the $10^00$ level instead of the $02^00$ level.

BRIEF DESCRIPTION OF THE DRAWINGS

The invention will become more readily apparent from the following exemplary description in connection with the accompanying drawings.

DESCRIPTION OF THE PREFERRED EMBODIMENT

While the direct electrical discharge excitation of the $CO_2$ gas laser described herein to produce either 14 micron or 16 micron laser radiation may be achieved by pulsed or CW operation, the following discussions will be directed to a technique employing pulsed electrical discharge excitation of a cryogenically cooled $CO_2:N_2:He$ laser gas mixture.

Figure 1:
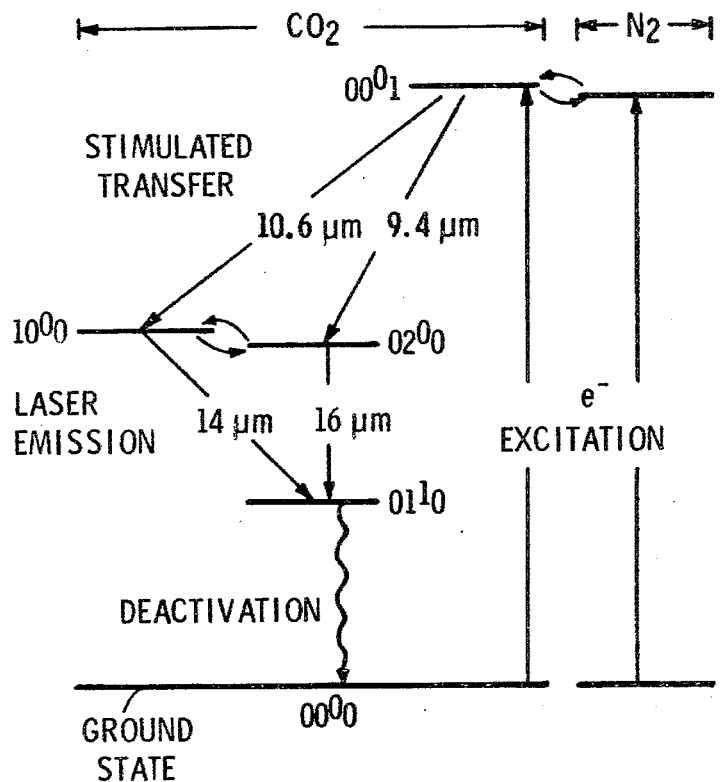
FIG. 1 illustrates the vibrational energy level diagram of the $CO_2$ and $N_2$ and shows the process leading to the generation of 14 and 16 micron laser radiation.

Referring to FIG. 1, there is illustrated a vibrational energy level diagram for $CO_2$ and $N_2$, wherein $N_2$ functions as an energizing gas, illustrating the process steps leading to both 14 micron and 16 micron laser emission from direct electrical excitation. During the pulsed electrical discharge in the laser gas mixture consisting of $CO_2$, $N_2$ and He, the lower vibrational states of $CO_2$ shown in FIG. 1 are all populated. The decay of the population of these levels in the afterglow period following the discharge is influenced by the presence of helium, He, in the laser gas mixture which tends to preferentially deactivate the $01^10$ and $02^00$ to the population determined by the background gas temperature, and by the presence of nitrogen $N_2$ which sustains the $00^01$ population by resonance transfer. The resulting population inversion on the $00^01$ level can be rapidly transferred to the $02^00$ level by stimulated emission using an externally applied 9.4 micron transfer laser pulse as described in the above-identified references. If the background gas temperature is sufficiently low, a transient inversion between the $02^00$ and $01^10$ levels is formed. The 16 micron laser radiation can then be achieved by amplification of an applied 16 micron flux at appropriate wavelengths, or through the buildup of 16 micron flux in an oscillator laser configuration with an appropriate optical cavity.

Similarly, as illustrated in FIG. 1, laser emission at 14 microns can be achieved if a transfer pulse at 10.6 microns is employed to populate the $10^00$ state of $CO_2$.

Figure 2A:
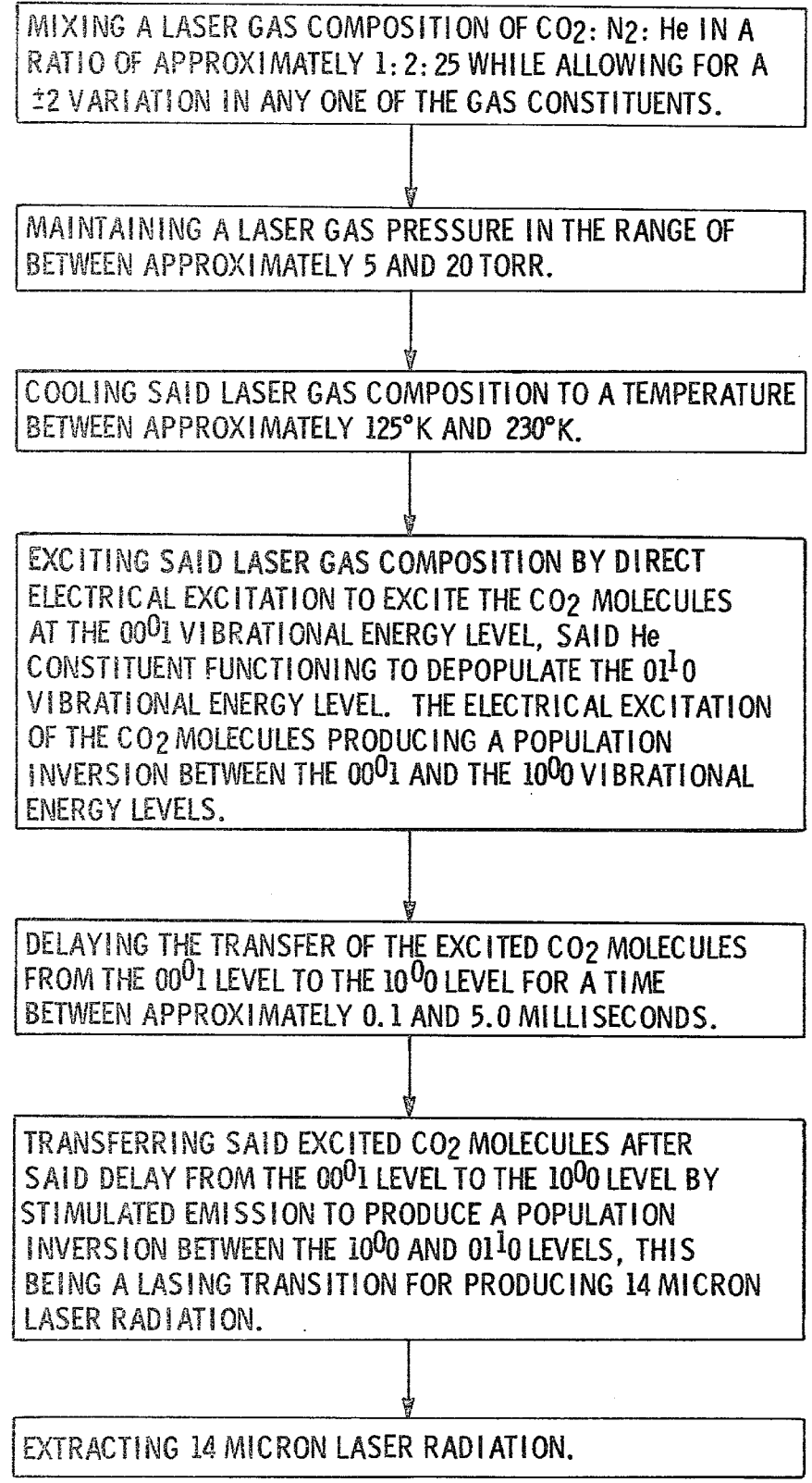
FIGS. 2A and 2B summarize the process steps for generating 14 micron and 16 micron laser radiation, respectively, in accordance with the invention.
Figure 2B:
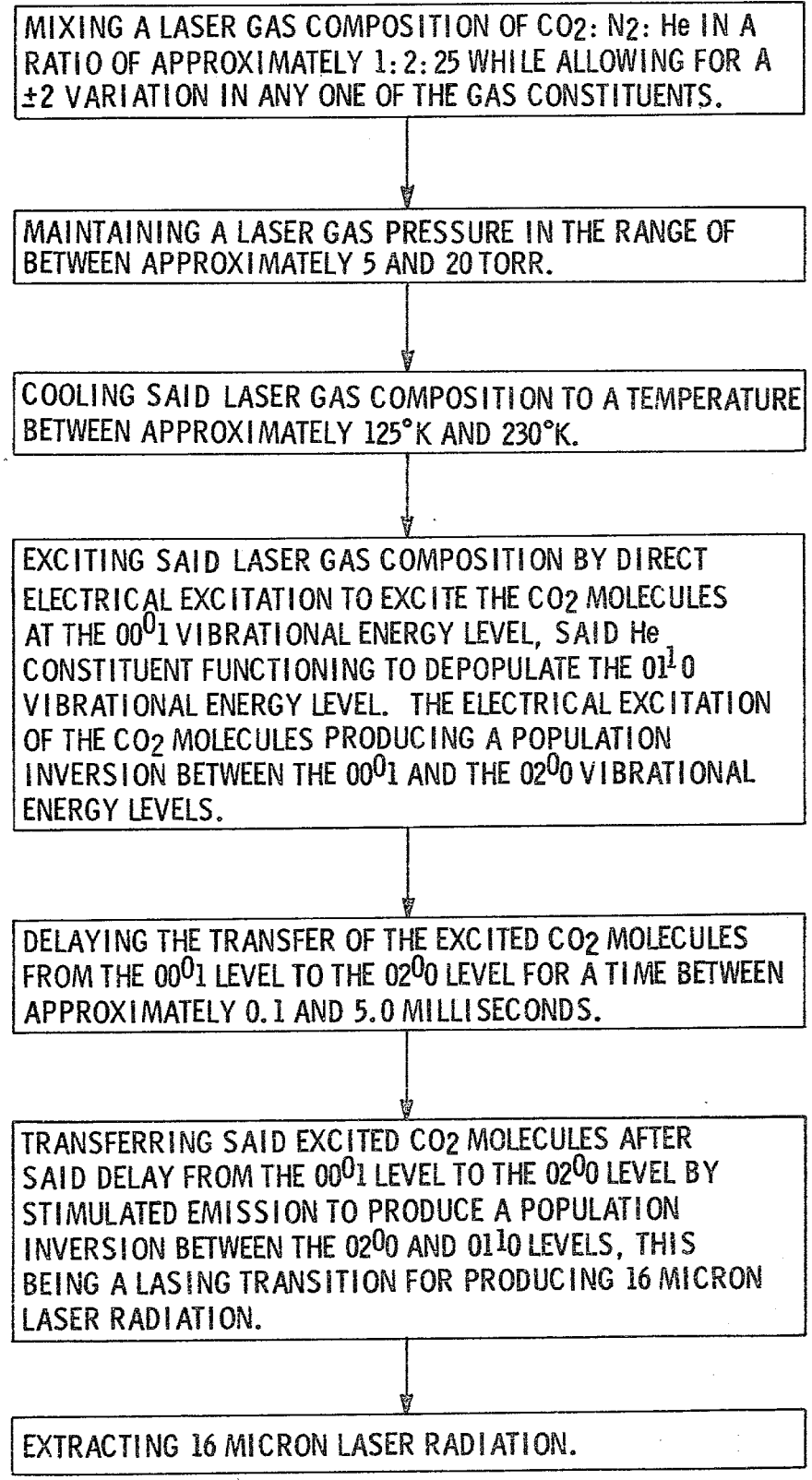

The process steps for effecting improved laser radiation output at 14 and 16 microns in accordance with this invention are illustrated in FIGS. 2A and 2B, respectively.

While the vibrational energy level diagram of FIG. 1 illustrates the general steps for achieving 14 and 16 micron laser radiation from a $CO_2$ laser gas medium employing nitrogen as an energizing gas, the invention is described herein with respect to the improved technique as it is employed to produce 16 micron laser radiation on the $02^00$–$01^10$ transition in $CO_2$. The basic elements and conditions required to produce the desired 16 micron laser radiation include:

(a) a laser gas volume consisting of a laser gas mixture of $CO_2$:$N_2$:He;

(b) direct electrical discharge excitation, pulsed or CW, of the laser gas mixture. The electrical discharge can be either longitudinal or transverse electrical discharge;

(c) maintaining the temperature of the laser gas mixture at a temperature between approximately 125° K. and 230° K., and preferably between 125° K. and 150° K.;

(d) flowing the laser gas mixture parallel to or transverse to the electric field vector of the electrical excitation source;

(e) exciting and controlling the photon flux in the 9.4 micron band of the $CO_2$ molecule that is applied to the laser gas medium in such a manner that a substantial fraction of the $00^01$ $CO_2$ population is transferred to the $02^00$ level in a time less than the collisional deactivation time of the $02^00$ level. The 9.4 micron laser flux can be generated either within the laser gas medium volume or via an external system. The 9.4 micron laser flux can be generated internally due to the fact that an inversion of the $00^01$ level over the $02^00$ level is produced in the afterglow of the discharge;

(f) delaying the 9.4 micron flux relative to the discharge pulse to permit the populations of the $02^00$ and $01^10$ levels to decay.

(g) controlling the photon flux on the 16 micron transition in the laser gas volume such that the laser energy is extracted at the 16 micron wavelength. When CW electrical excitation is employed, the emission of 16 micron laser flux will occur downstream of the laser gas volume in order to achieve the desired delay of the 9.4 micron flux relative to the electrical discharge excitation. Numerous state-of-the-art techniques are available for controlling the 16 micron laser flux, including the use of both stable and unstable cavity optics as well as elements for controlling the wavelength of the 16 micron flux such as gratings, prisms, gain cells, absorption cells, etalons, etc.

Figure 3:
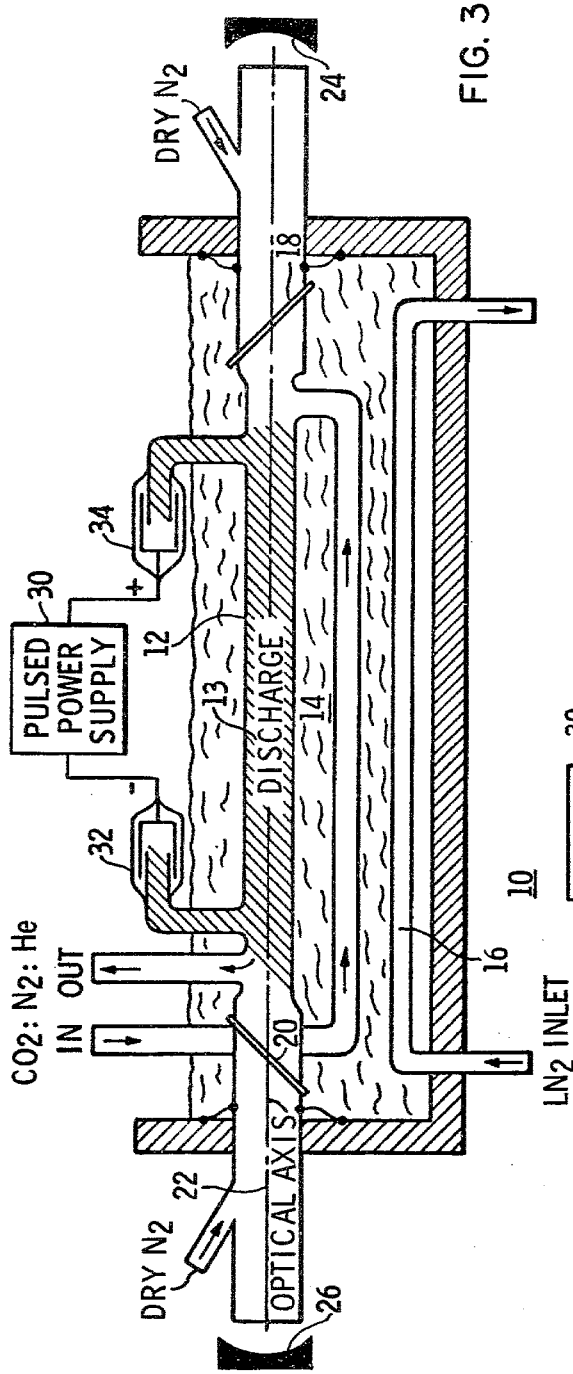
FIG. 3 is a sectioned schematic illustration of a laser discharge tube suitable for implementing the novel laser operation.

A typical assembly of components to form a laser apparatus 10 to satisfy the above structural and functional requirements is schematically illustrated in FIG. 3. A discharge tube 12 is immersed in a liquid bath 14, such as 1-Proponal, which is cooled by liquid nitrogen flowing through cooling coils 16. Brewster windows 18 and 20 positioned along the optical axis 22 close off the discharge tube 12. The final elements comprising the discharge cavity are cavity mirrors 24 and 26 disposed at either end of the discharge tube 12. In the embodiment of FIG. 3, dry nitrogen is introduced into the region between the Brewster windows and the cavity mirrors to eliminate fogging of the optical windows and to remove warm $CO_2$ from the optical cavity. The laser gas mixture of $CO_2$:$N_2$:He passes through flow tube 28, which is immersed in the liquid bath 14 prior to passage through the laser discharge region 11. The laser discharge is excited by a voltage pulse generated by pulsed power supply 30 which is connected to laser electrodes 32 and 34 disposed at either end of the discharge region 11. Typically, the pulsed power supply 30 may consist of a single 50 $\mu f$ capacitor charged to between 5 and 12 kV, which produces a voltage pulse of approximately 2 microseconds duration.

Figure 4:
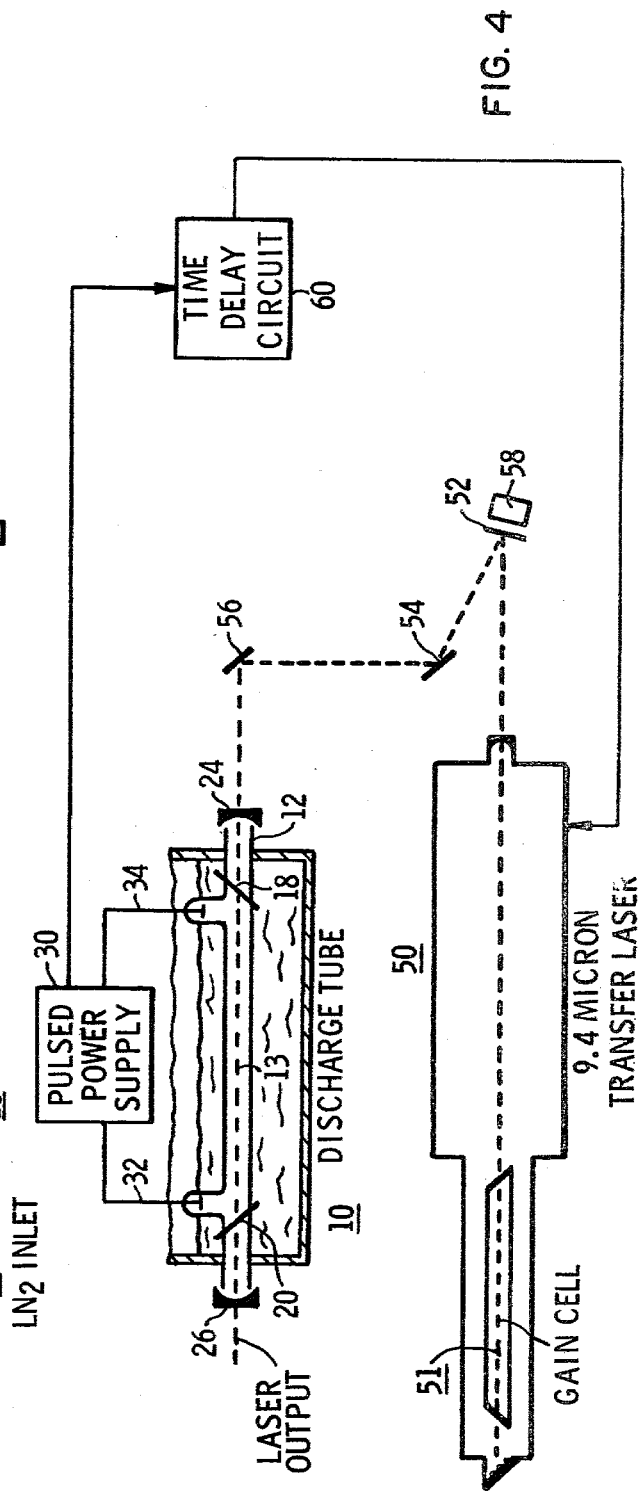
FIG. 4 is a schematic illustration of a laser discharge tube in combination with an external 9.4 micron transfer laser; and, FIG. 5 is a graphical illustration of 16 micron laser radiation generated in accordance with the disclosed inventive technique.

Referring to FIG. 4, there is schematically illustrated the laser 10 of FIG. 3 in combination with a 9.4 micron transfer laser 50 which is employed to effect the transfer between the $00^01$ $CO_2$ vibrational energy level and the $02^00$ $CO_2$ vibrational energy level as illustrated in FIG. 1.

In the configuration in FIG. 3, cavity mirror 24 is the input mirror and typically has a reflectivity of greater than 99% at 16 microns and is greater than 60% transmitting at 9.4 microns. Cavity mirror 26, which is the output mirror, typically has a reflectivity ranging between about 90 and 98%.

The 9.4 micron transfer laser 50 can be suitably implemented through the use of a commercially available Lumonics model 203 high energy pulsed laser operating with stable output optics and grating control for single line emission. The mirrors 52, 54 and 56 are used to direct the transfer laser beam from the 9.4 micron transfer laser 50 into the active region of the discharge tube 12 of the laser apparatus 10. The high energy output from the 9.4 transfer laser 50, i.e. 2–3 joules/pulse, is reduced to levels of approximately 100–300 millijoules/pulse, to minimize possible damage to the cavity mirrors 24 and 26. This reduction is achieved by using uncoated low reflectivity materials, i.e. NaCl or ZnSe, in mirror 52. The remaining transfer laser beam energy is absorbed in the beam dump element 58.

The gain cell 51 is used to narrow the output line width of the transfer laser 50 to enhance the stimulated emission in the discharge region 13 by achieving a preferred match between the wavelength of the transfer laser 50 and the corresponding absorption band in the discharge region 13.

While the appreciation of the transitions illustrated in FIG. 1 have been described in the above-identified references, detailed experimentation has confirmed the criticality of control over the laser parameters of gas composition, pressure, and temperature, to achieve successful 16 micron laser operation. Operational experimentation has confirmed the following ranges of parameters to be essential to achieve desired 16 micron laser radiation:

(a) a laser gas mixture of $CO_2$:$N_2$:He in the approximate ratio of 1:2:25 while allowing for variations of gas composition by a factor of ±2 in any one of the gas constituents but not more than one at any given time; an example of this variation for the $N_2$ constituent is 1:4:25 and 1:1:25;

(b) a laser gas pressure in the discharge region of between approximately 5 and 20 Torr, with optimum operation in the range of 8 to 12 Torr;

(c) a laser gas operating temperature corresponding to a laser discharge tube wall temperature of between approximately 125° K. and 230° K., with the optimum temperature being within a range of 125° K. and 150° K.; and (d) a time delay between the electrical excitation pulse from the pulsed power supply 30 and the 9.4 micron transfer laser pulse from the transfer laser 50 to permit a more complete relaxation of the $01^10$ $CO_2$ vibration energy level and hence produce a greater inversion on the lasing transition. The decrease of laser output for longer delay times reflects the decay of the population of the $00^01$ $CO_2$ vibrational energy level.

Figure 5:
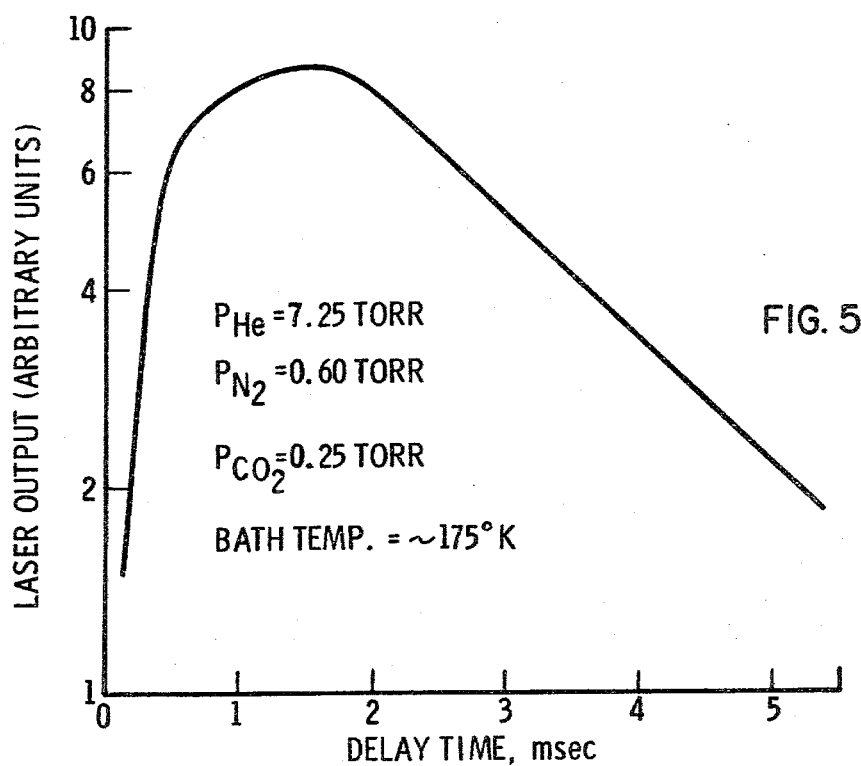

This delay time has a significant effect on the 16 micron laser output. Experimentation has indicated that a suitable delay is in the range of between approximately 0.1 milliseconds and 5.0 milliseconds with the optimum delay being in the range of between approximately 1.0 and 1.5 milliseconds. The effect of this delay time on laser output is evident from the plotted experimental data appearing in FIG. 5. The increase of 16 micron laser output with a delay time in the 1–5 millisecond range is attributed to the more complete relaxation of the $01^10$ $CO_2$ vibrational energy level which occurs as a result of the delay. This relaxation enhances the population inversion on the lasing transition between the $02^00$ and $01^10$ levels. A similar operational advantage is realized when a delay is included in the 14 micron operation of the $CO_2$ laser.

In the embodiment of FIG. 4 the delay time is implemented by a time delay circuit 60 connected between the pulsed power supply 30 and the 9.4 micron transfer laser 50. Numerous state of the art techniques can be employed to satisfy the time delay function of time delay circuit 60 whereby the activation of transfer laser 50 is delayed a predetermined time following the electrical discharge excitation initiated by the pulsed power supply 30. A suitable time delay circuit is described in the above-identified copending application.

Laser gas composition additives such as $H_2$, NO and CO can be used to improve laser performance. The addition of $H_2$ at a concentration less than 5% results in a demonstrated improvement in laser output energy. This improvement results from a more complete deactivation of the $01^10$ level population in the afterglow of the discharge.

The temperature limitation defined above is determined on the basis that operation at temperatures below approximately 125° K. becomes marginal due to the fact the $CO_2$ content of the gas mixture begins to freeze out, while laser output decreases with increasing temperature and finally disappears at a temperature of approximately 230° K.

What we claim is:

1. In a method of operating a $CO_2$ gas laser apparatus to produce a 16 micron laser radiation wherein the gas laser medium consists of a composition of $CO_2$, $N_2$ and He with $N_2$ functioning as an energizing gas constituent to excite the $CO_2$ molecules via collisional transfer, including the steps of electrically exciting the $CO_2$ gas laser medium to populate the $00^01$ vibrational energy level with excited $CO_2$ molecules to achieve a population inversion between the $00^01$ and $02^00$ vibrational energy levels of the $CO_2$ molecule, transferring the excited $CO_2$ molecules from the $00^01$ vibrational energy level to the $02^00$ vibrational energy level to achieve a population inversion between the $02^00$ vibrational energy level and the $01^10$ vibrational energy level of the $CO_2$ molecule, and extracting 16 micron laser radiation on the basis of the population inversion between the $02^00$ vibrational energy level and the $01^10$ vibrational energy level of the $CO_2$ molecule, wherein the He gas constituent functions to depopulate the $01^10$ vibrational energy level of the $CO_2$ molecule to enhance said population inversion, the improvements comprising, mixing said laser gas composition of $CO_2:N_2:He$ in a ratio of approximately 1:2:25 allowing for a ±2 variation in any one of said gas constituents, maintaining a laser gas pressure sufficient to support electrical discharge in said laser gas composition, cooling said laser gas composition to a temperature in the range of approximately 125° K. and 230° K., and delaying the transfer of the excited $CO_2$ molecules from the $00^01$ level to the $02^00$ vibrational energy level of the $CO_2$ molecule for a time following the electrical excitation of the laser gas composition being in a range between approximately 0.1 milliseconds and 5 milliseconds.

2. In a method as claimed in claim 1 wherein said pressure of said laser gas composition is maintained between approximately 5 and 20 Torr.

3. In a method as claimed in claim 1 wherein the laser gas composition is cooled to a temperature between approximately 125° K. and 150° K.

4. In a method as claimed in claim 1 wherein said delay is for a time between approximately 1 and 1.5 milliseconds.

5. In a method of operating a $CO_2$ gas laser apparatus to produce 14 micron laser radiation wherein the gas laser medium consists of a composition of $CO_2$, $N_2$ and He with $N_2$ functioning as an energizing gas constituent to excite the $CO_2$ molecules via collisional transfer, including the steps of electrically exciting the $CO_2$ gas laser medium to populate the $00^01$ vibrational energy level with excited $CO_2$ molecules to achieve a population inversion between the $00^01$ and $10^00$ vibrational energy levels of the $CO_2$ molecule, transferring the excited $CO_2$ molecules from the $00^01$ vibrational energy level to the $10^00$ vibrational energy level to achieve a population inversion between the $10^00$ vibrational level and the $01^10$ vibrational energy level of the $CO_2$ molecule, and extracting 14 micron laser radiation on the basis of the population inversion between the $10^00$ vibrational energy level and the $01^10$ vibrational energy level of the $CO_2$ molecule, wherein the He gas constituent functions to depopulate the $01^10$ vibrational energy level of the $CO_2$ molecule to enhance said population inversion, the improvement comprising, mixing said laser gas composition of $CO_2:N_2:He$ in a ratio of approximately 1:2:25 allowing for ±2 variation in any one of said gas constituents, maintaining a laser gas pressure sufficient to support electrical discharge in said laser gas composition, cooling said laser gas composition to a temperature in the range of approximately 125° K. and 230° K., and delaying the transfer of the excited $CO_2$ molecules from the $00^01$ level to the $10^00$ vibrational energy level of the $CO_2$ molecule for a time following the electrical excitation of the laser gas composition being in a range between approximately 0.1 milliseconds and 5 milliseconds.

6. In a method as claimed in claim 5 wherein said pressure of said laser gas composition is maintained between approximately 5 and 20 Torr.

7. In a method as claimed in claim 5 wherein the laser gas composition is cooled to a temperature between approximately 125° K. and 150° K.

8. In a method as claimed in claim 5 wherein said delay is for a time between approximately 1 and 1.5 milliseconds.

* * * * *